June 16, 1953 M. L. VANDERMEER 2,641,957
MIRROR AND LIGHT BEAM WHEEL CHECKING APPARATUS AND
METHOD OF CORRECTING FOR RUN-OUT IN EMPLOYING SAME
Filed July 14, 1948 3 Sheets-Sheet 1
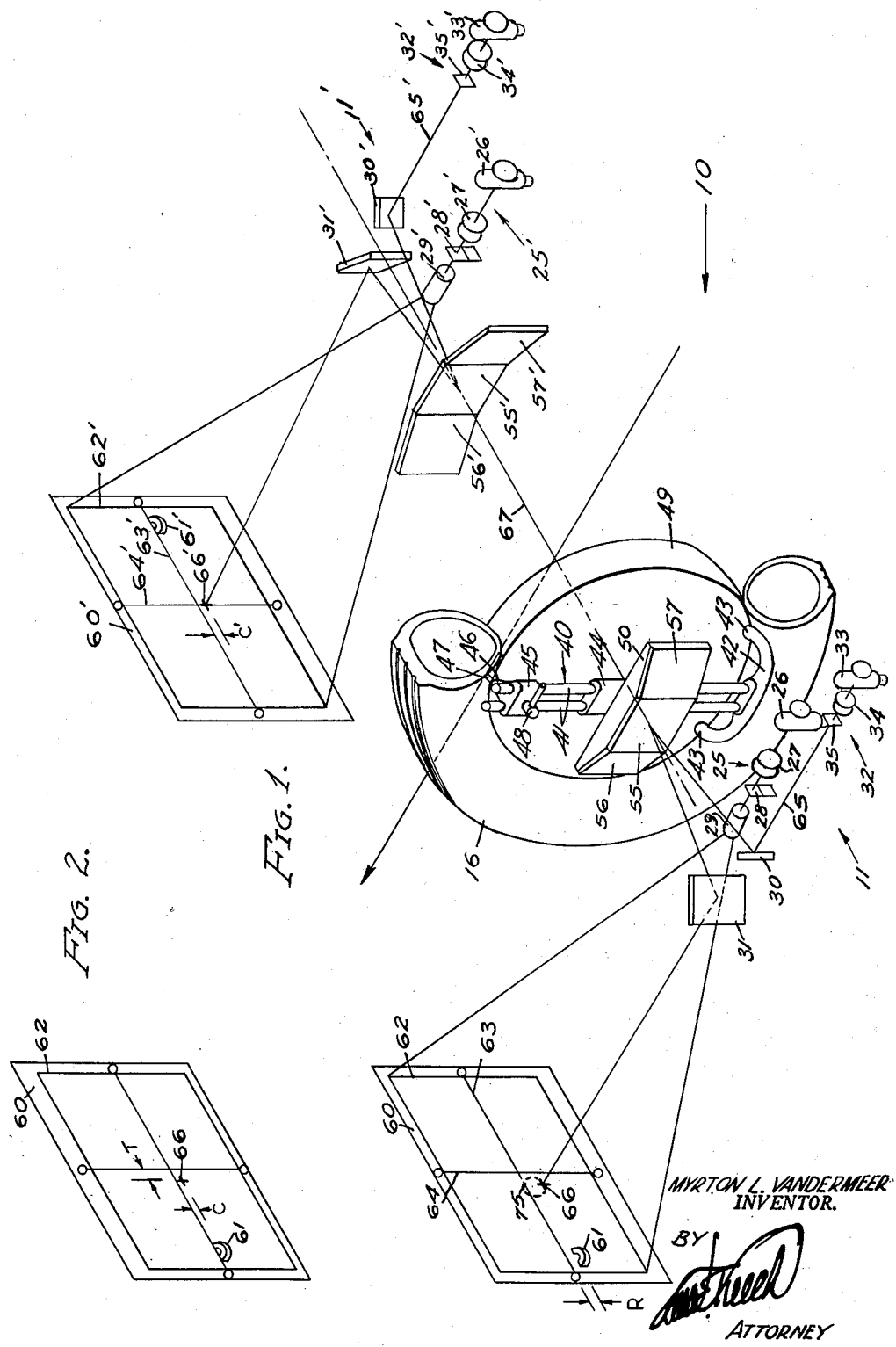
MYRTON L. VANDERMEER
INVENTOR.
BY
ATTORNEY

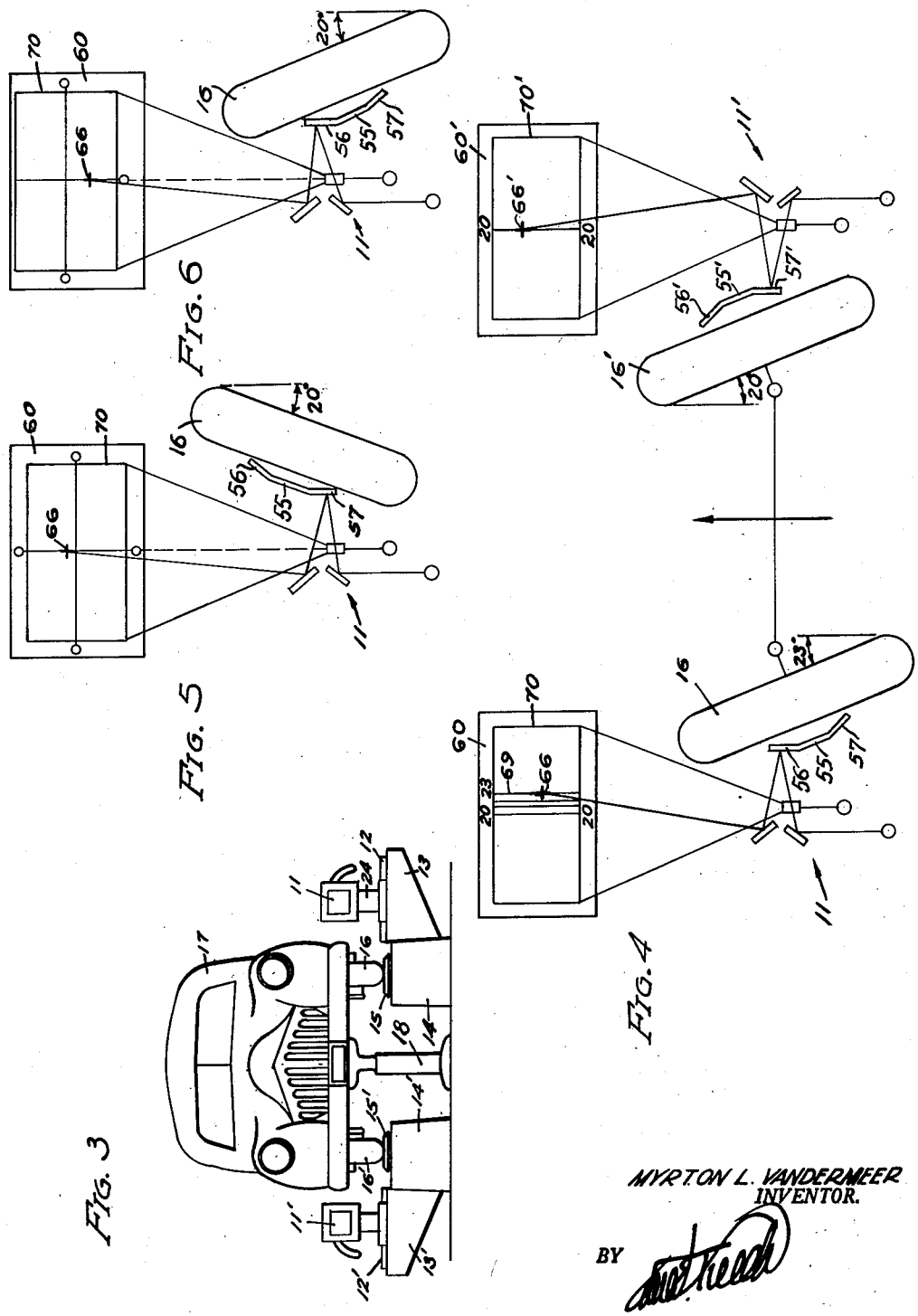

June 16, 1953  M. L. VANDERMEER  2,641,957
MIRROR AND LIGHT BEAM WHEEL CHECKING APPARATUS AND
METHOD OF CORRECTING FOR RUN-OUT IN EMPLOYING SAME
Filed July 14, 1948  3 Sheets-Sheet 3

Myrton L. Vandermeer
INVENTOR
By
ATTORNEY

Patented June 16, 1953

2,641,957

UNITED STATES PATENT OFFICE 2,641,957

MIRROR AND LIGHT BEAM WHEEL CHECKING APPARATUS AND METHOD OF CORRECTING FOR RUN-OUT IN EMPLOYING SAME

Myrton L. Vandermeer, Lansing, Mich., assignor to Food Machinery and Chemical Corporation, San Jose, Calif., a corporation of Delaware Application July 14, 1948, Serial No. 38,616

7 Claims. (Cl. 88—14)

This invention relates to the servicing of automobiles and is particularly useful in measuring the alignment characteristics of the dirigible wheels of an automobile for the purpose of enabling these to be maintained at their correct values.

These alignment characteristics have to do with the mounting of the dirigible wheels of an automobile (which is usually the two front wheels) and are referred to in the art as camber, toe, steering geometry, caster and king pin inclination.

The camber of a dirigible wheel is the angle the plane thereof makes with a vertical plane containing the fore-and-aft axis of the vehicle when this wheel is turned straight ahead.

Toe (referred to specifically as toe-in or toe-out) has to do with two dirigible wheels and is the angle at which the planes of these wheels converge or diverge forwardly when the vehicle is travelling straight ahead.

Steering geometry also has to do with two dirigible wheels and represents the difference between the angles which said wheels are given when turning the vehicle to the right or left so as to make the axes of these two dirigible wheels intersect the axis of the rear wheels at the same point.

Caster of a dirigible wheel is the angle which the upper end of the king pin thereof is inclined rearwardly.

King pin inclination of a given dirigible wheel is the angle which the upper end of the king pin thereof is inclined outwardly from the vehicle.

The above definitions of camber, toe and steering geometry assume that each of the dirigible wheels mentioned therein lies in a plane which is perpendicular with the axis of the spindle of the wheel. In other words, the true values of said alignment characteristics are those which would exist if the planes of the wheels were thus perpendicular to their axes of rotation.

To obtain correct values for these characteristics, therefore, it is found convenient to first establish vertical and horizontal reference lines, with respect to each wheel, which are perpendicular to the axis of the spindle of that wheel. Such lines may be called "axis-normal" lines.

To establish axis-normal lines, some devices attach directly onto the spindle. Other types of apparatus establish axis-normal lines through a member which contacts a plurality of points on the outer side wall of the tire of the wheel or a plurality of points on one of the annular outer surfaces of the rim of the wheel.

This invention relates primarily to apparatus of the latter general type, i. e., which utilizes a member contacting the tire or the rim of the wheel for establishing axis-normal lines.

It is an object of this invention to provide such an apparatus in which compensation may be made for deviation of the plane containing the points on the wheel thus contacted from true perpendicularity with the axis of the spindle of the wheel whereby vertical and horizontal axis-normal lines may be established for that wheel relatively easily and the measurement of alignment characteristics by said apparatus thus facilitated.

Apparatus contacting the tire or rim of the wheel to establish axis-normal lines may be termed "wheel contacting" apparatus and this can be divided into two types, one of which constitutes a mechanical system and therefore may be termed "mechanical" and the other of which operates by a system of mirrors and light beams and therefore may be termed "optical."

A specimen of mechanical alignment characteristic measurement equipment at one time used extensively is shown in U. S. Letters Patent to Morse et al., No. 2,061,326, issued November 17, 1936. A specimen of optical alignment characteristic measuring apparatus now coming into use commercially, is shown in the co-pending application of Tracy Carrigan, Serial No. 659,317, filed April 3, 1946, on "Method of and Apparatus for Measuring Alignment Characteristics of Front and Rear Wheels" which issued on June 24, 1952, as U. S. Letters Patent No. 2,601,262.

While broadly applicable to all wheel contacting apparatus for measuring alignment characteristics, my invention is especially useful when incorporated with the optical type of such apparatus and will therefore be disclosed herein as incorporated with an apparatus of this type.

This type of apparatus utilizes, in connection with each of the pair of dirigible wheels it operates on, a mirror mount which attaches at three points to the outer peripheral flange of the rim of the wheel and carries a laterally facing mirror pivoted to swing on an axis perpendicular to the plane of said points with its reflecting face parallel with said plane.

Mounted on a base, and slideable towards and away from said wheel mirror, is an optical unit which projects a selected one of several measuring charts on a screen spaced forwardly therefrom while a beam of light, projected from said unit against said wheel mirror, is reflected therefrom and directed onto said chart, the latter being calibrated to measure one or more of said alignment characteristics providing the unit is properly spaced from the mirror and that the reflecting face of the mirror is perpendicular to the axis of said wheel.

Owing to defects in the construction of automobile wheels and to the strains imposed on these in service, all but a very few of the wheels tested are found to be bent out of perpendicularity with their respective axes of rotation. When the mirror mount is correctly applied, the reflecting face of the mirror is thus also out of perpendicularity with the wheel axis. In some instances, however, non-perpendicularity of the mirror to the wheel axis may be due entirely to the incorrect application of the mirror mount to the wheel, and the wheel itself be perfectly true.

To compensate for this deviation from perpendicularity of the mirror face with the axis of a wheel, which deviation is known as "runout," it has been customary heretofore, in measuring the camber, for instance, of that wheel, to first rotate the wheel, causing the image of the beam on the chart to follow a circular path thereon. The wheel was then halted and lowered with the image located at one end or the other of the horizontal diameter of said circle.

By this step, what has been referred to as a "vertical" axis-normal line was established in the plane of the face of the mirror. This line is not strictly vertical, however, but is determined by the intersection of that vertical plane which contains the axis of the wheel, with the plane of the reflecting face of the wheel mirror. If there is positive camber in the wheel, of course, this line will naturally tilt outwardly from vertical exactly the same number of degrees as the camber of the wheel because this line will be parallel with that plane in which the wheel would lie if the wheel were true.

To accurately measure toe and steering geometry by the practice heretofore followed, each of the dirigible wheels must now be again jacked up, rotated and lowered, this time, with the beam image for that wheel at the upper or lower extremity of the vertical diameter of the circle traced by said image. This will establish horizontal axis-normal lines in the planes of the reflecting faces of the wheel mirrors which will permit accurate measurement, according to the positions occupied by the beam images on said charts, of toe and steering geometry.

Frequently, after this double wheel jacking operation has been accomplished, it is necessary to recheck the camber to see if any change therein has been effected by corrections made in the shape of parts contained in the front wheel suspension to modify toe and/or steering geometry. This necessitates each of the wheels being jacked up a third time to re-establish vertical axis-normal lines in the planes of the reflecting faces of the wheel mirrors. This procedure not-infrequently requires, therefore, the jacking up of each of the front wheels three or more times before the measurement and correction of the alignment characteristics of these wheels have been completed.

It is another object of this invention to provide an optical method of and apparatus for measuring alignment characteristics of dirigible wheels by which the same results in accuracy of measurement may be obtained as by the procedure above described, but without the necessity of jacking up the wheels being tested more than once.

The manner of accomplishing the foregoing objects as well as further objects and advantages will be made manifest in the following description taken in connection with the accompanying drawings in which:

Fig. 1 is a diagrammatic perspective view of a preferred embodiment of the invention in an optical wheel alignment characteristic measuring apparatus.

Fig. 2 is a diagrammatic perspective view of the left-hand screen shown in Fig. 1 at the conclusion of the adjustment of the chart thereon for the purpose of making full correction for the runout in the left wheel.

Fig. 3 is a diagrammatic front elevational view of the apparatus shown in Fig. 1 and illustrating the manner in which the optical units thereof are related to an automobile while measuring alignment characteristic of the front wheels of the latter.

Fig. 4 is a diagrammatic plan view of a pair of dirigible wheels and the apparatus shown in Fig. 1, with said apparatus measuring the steering geometry of said wheels.

Figs. 5 and 6 illustrate initial and final steps in the operation of the apparatus of the present invention in the measurement of caster.

Fig. 7 illustrates a left camber and toe chart.

Fig. 8 illustrates a right camber and toe chart.

Fig. 9 illustrates a left caster and steering geometry chart.

Fig. 10 illustrates a right caster and steering geometry chart.

Figure 8:
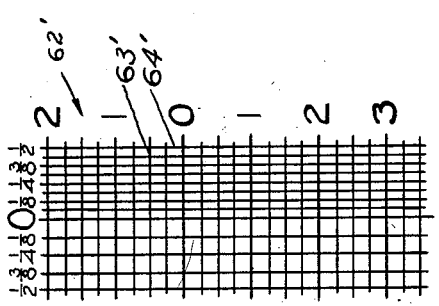
Figs. 7, 8, 9 and 10 illustrate charts used in a commercial embodiment of the invention.

Referring specifically to the drawings, Figs. 1 and 3 diagrammatically show an optical dirigible wheel alignment measuring apparatus 10 which includes left and right optical units 11 and 11' which are slideable horizontally towards and away from each other on slides 12 and 12' provided on booms 13 and 13' which project laterally from wheel supporting pedestals 14 and 14', the latter being fastened securely to the floor.

The pedestals 14 and 14' are provided with turn-tables 15 and 15' for supporting the dirigible front wheels 16 and 16' of an automobile 17, there being a suitable ramp (not shown) upon which this automobile may be driven to position the front wheels thereof on the turn-tables 15 and 15' as shown in Fig. 3.

A jack 18 is provided for lifting the front end of automobile 17, when it is desired to free the wheels 16 and 16' for rotation.

The optical units 11 and 11' are reverse duplicates of each other and identical accessory equipment is associated with each so that a description of unit 11 and its associated equipment will suffice for both of these units. Subsequent references to parts of the unit 11' and its associated equipment will be made by use of the numbers applied to corresponding parts of unit 11 and its accessories, with prime attached.

With this understanding, it is noted that unit 11 includes a base 24 on which is mounted a chart projector 25 having a lamp 26, condenser lenses 27, a vertically shiftable chart film slide 28 and a projection lens 29.

Also mounted on base 24 are mirrors 30 and 31 and a light beam projector 32 having a lamp 33, condenser lenses 34 and a cross hair marker 35.

Associated with the unit 11 is a mirror mount 40, the detail structure of which is fully disclosed in the co-pending application of Herbert G. Holmes, Serial No. 614,267, filed September 4, 1945 on "Wheel Mirror Mount" which issued on July 5, 1949 as U. S. Letters Patent No. 2,475,502. This mount includes a pair of bars 41 fixed in a bracket 42 on which are formed jaws 43. Slideable on the bars 41 is a mirror support 44 and a clamp 45 on which is provided a jaw 46. Each of the jaws 43 and 46 has an inner face, these faces lying in a plane which is parallel with the plane of the bars 41, these jaws having teeth 47 in the form of hardened screws extending inwardly from said faces.

The clamp 45 has a cam 48 which is manually operable when the mirror mount 40 has been positioned as shown in Fig. 1 on the rim 49 of the wheel 16 to sink the teeth 47 into this rim and thereby secure the mount 40 in place on the rim with the inner faces of the jaws 43 and 46 snugly bearing against the peripheral outer flange of the rim 49.

Pivotally mounted on the support 44, on an axis perpendicular with the plane of the bars 41, is a wheel mirror assembly 50. Fixed on this assembly, with its reflecting surface parallel with said wheel plane, is a lateral wheel mirror 55 while swing mirrors 56 and 57 are also fixed thereon, the latter being slanted away from the lateral mirror 55 at angles of 20° therewith.

The axis on which the assembly 50 is pivoted on the support 44 is above its center of gravity so that the assembly 50 remains horizontal when the wheel 16 is rotated.

Also associated with the unit 11 is a screen 60 which is supported in vertical position and preferably in a plane perpendicular to the axis of the projector 25 and disposed symmetrically relative to the vertical plane containing said axis. The screen 60 is made of a magnetic material such as sheet steel and is provided with a permanent horseshoe magnet 61 which adheres to the front face of the screen 60 in any position in which it may be placed thereagainst (as shown in Figs. 1 and 2).

Operation

Figure 7:
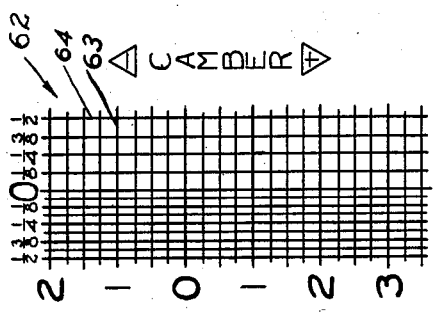
Figure 10:
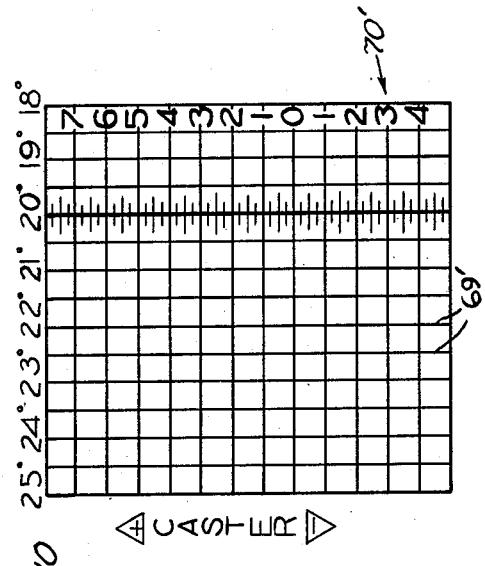

The chart film slide 28 is provided with a plurality of chart miniatures each of which may be projected in enlarged form as a chart on the screen 60. In Fig. 1, the slide 28 is shown in its downwardmost position in which it is placed to cause the projector 25 to project onto the screen 60 a camber and toe chart 62. This chart has horizontal calibrations 63 for measuring camber and vertical calibrations 64 for measuring toe (Fig. 7).

When the unit 11 is energized so as to project the chart 62 on the screen 60, the projector 32 projects a beam of light 65 (formed by the mask 35 into the shape of a cross hair) onto the mirror 30 from which the beam is reflected onto the lateral mirror 55 when the wheel 16 is turned approximately straight ahead (as in Fig. 1). This beam is thus reflected onto the mirror 31 and directed thereby onto the screen 60 where it produces a cross hair image 66.

The chart 62 is so calibrated that when the screen 60 is set up, as described, a predetermined distance from and parallel to a line 67 which passes through the centers of the wheels 16 and 16' (with the latter turned straight ahead), and when said unit 11 is spaced a specified distance from the mirror 55, the cross hair image 66 may be employed in the manner about to be described to utilize the horizontal calibrations 63 on the chart 62 to measure the camber of the wheel 16 and to utilize the vertical calibrations 64 on the chart 62 to measure the toe of the two wheels 16 and 16'.

The chart projector 25 is preferably disposed below and inwardly from the projector 32 and the projection axes of these projectors are preferably horizontal.

The mirrors 30 and 31 are fixed vertically on the base 24 so that the reflection from the mirror 30 of the beam 65 is also horizontal.

The slideable mounting of the unit 11 is to permit this to be shifted into that particular spaced relation with the mirror 55 which is necessary to secure accurate readings of alignment characteristics involving the wheel 16. The apparatus 10 is designed for a spacing of ten-inches between the mirror 55 and the vertical plane containing the axis of the projector 25. The unit 11 may be set to produce this spacing by use of a ruler or any desired means of measurement. The apparatus 10 is also designed to have the screen 60 spaced seventy-two inches from the line 67. The proper location of the chart 62 on the screen 60 is determined by a stop (not shown) which limits the downward movement of the chart slide 28 to the position in which it is shown in Fig. 1.

Whenever the chart slide 28 is raised from this position, it causes the chart 62 to descend on the screen 60. When the chart slide 28 is in its upwardmost position, it presents a miniature of a caster chart 70 for projection onto the screen 60 (Figs. 4, 5, 6 and 9).

Recalling that the unit 11' and its associated parts are reverse duplicates of the unit 11 and its associated parts, the apparatus 10 is now seen to be in readiness for proceeding to measure the camber of the two wheels 16 and 16' and the toe or forward convergence or divergence, as the case may be, of the planes which these wheels would lie in if they were true relative to their respective axes of rotation.

As the first step in the method of my invention, compensation is made for the "runout" of the wheels 16 and 16'. This runout is actually eliminated by the method of my invention as follows:

The wheel 16 is jacked up and slowly rotated manually. Assuming that this wheel is not strictly true relative to its axis of rotation or that the mirror mount 40 is improperly applied to the rim 49 so that for either or both of these causes the reflecting face of the mirror 55 is non-perpendicular to said axis, this rotation of the wheel 16 will cause the cross hair image 66 to travel about a circular path 75 as indicated by dotted lines on the chart 62 in Fig. 1.

Having observed the radius of this path, which is known as a "wobble circle," the wheel 16 is adjusted rotationally to bring the cross hair image 66 at the lower end of the vertical diameter of this circle where the wheel is halted and lowered onto its turn-table 15.

The magnet 61 is now shifted on the screen 60 until it marks a point below the horizontal zero line on the chart 62 a distance equal to the radius of the wobble circle 75, and indicated by dimension lines R. The chart film slide 28 is now raised to lower the position of the chart 62 on the screen 60 (as shown in Fig. 2) to where the horizontal zero line of the chart 62 coincides with the point just marked by the magnet 61.

In other words, the chart 62 is lowered on the screen 60 a distance exactly equal to the radius of the wobble circle 75.

The advantage of using a marker on the screen 60, such as the magnet 61, to mark the distance which it is necessary to lower the chart 62 from its normal position in order to compensate for runout in the wheel 16, is that if, after shifting the chart 62 away from said compensated position (as for measuring caster or steering geometry) the operator again desires to check camber, he need merely shift the chart slide 28 back to where the horizontal zero line of chart 62 coincides with the upper edge of the marker magnet (as shown in Fig. 2) whereupon correct readings for camber of the wheel 16 may again be read by the location of the cross hair image 66 on the chart 62.

Figure 9:
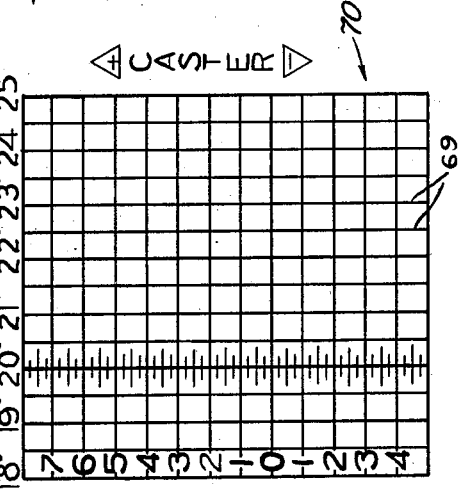

The compensation above described for runout not only achieves a true relation between the cross hair image 66 and the horizontal calibrations 63 for the reading of camber on the chart 62, but also achieves a true relation between the cross hair image 66 and the vertical calibrations 64 on the chart 62 for the reading of toe. This compensation for runout also creates a true relation between image 66 and the steering geometry calibrations 69 which are vertical and are customarily placed on the caster chart 70 (Fig. 9).

Fig. 1 shows compensation for runout in the right wheel 16' as already having been accomplished and the horizontal zero line of chart 60' as having been shifted towards the cross hair image 66' a distance equal to the radius of the wobble circle (not shown) which was produced by rotation of the wheel 16'. Thus the horizontal zero line of this chart is shown in Fig. 1 as coinciding with the upper face of the magnet marker 61' which had been placed to mark the proper adjusted position of the chart 62.

The wheels 16 and 16' are also shown in Fig. 1 as having been turned about their king pins to bring the cross hair image 66' on the vertical zero line of chart 62'.

By virtue of runout having already been compensated for, as above described, on both sides of the apparatus 10, the operator is now able to read true values for the camber of the wheels 16 and 16' by the distances which their cross hair images 66 and 66' are respectively located downwardly from the horizontal zero lines of their charts 62 and 62', it being understood that the chart 62 at this time is located on the screen 60 as shown in Fig. 2.

In other words, the true camber of the wheel 16 is indicated by dimension lines C in Fig. 2 and the true camber of the wheel 16' is indicated by dimension lines C' in Fig. 1.

With the apparatus thus set up, and with the cross hair image 66' located on the vertical zero line of chart 62', the toe of wheels 16 and 16' is accurately indicated by the dimension lines T in Fig. 2.

Because it has been found practically necessary to apply the vertical steering geometry calibrations 69 and 69' to caster charts 70 and 70', the chart film slides 28 and 28' must be shifted upwardly to project these caster charts onto the screens 60 and 60' in order to measure steering geometry.

Thus, the adjusted positions of charts 62 and 62' on their respective screens are lost but the magnets 61 and 61' remain in place on these screens, as shown in Fig. 1, so that if it is desired to again check camber, the chart film slides 28 and 28' may be returned downwardly and adjusted to reproject the camber charts 62 and 62' in the same relations to the magnets 61 and 61' as are shown for these, in Fig. 1 for chart 62', and in Fig. 2 for chart 62.

The measurement of steering geometry is illustrated in Fig. 4. To accomplish this, the charts 70 and 70' are merely projected in their normal positions on the screens 60 and 60' and the wheels turned about their king pins so that the right wheel is turned inwardly 20° from straight ahead. Turning the wheel 16' to this angle is indicated by the arrival of the cross hair image 66' on the vertical 20° line of the chart 70'. With the wheels 16 and 16' thus positioned, the steering geometry, or angle relative to straight ahead of the left wheel 16, may be read by the location of the cross hair image 66 on the vertical calibrations 69 of chart 70. In Fig. 4 this is shown, for the purpose of illustration, as being 23°.

While the caster charts 70 and 70' are thus projected on the screens 60 and 60', the caster of the wheels 16 and 16' may be measured. Figs 5 and 6 illustrate the measurement of caster for the wheel 16.

The first step in this procedure (Fig. 5) is to turn the wheel 16 outwardly 20° from straight ahead which is accurately determined when the cross hair image 66 falls on the vertical zero line of the chart 70. The chart film slide 28 is now shifted vertically to raise or lower the chart 70 on the screen 60 until the horizontal zero line of the chart is brought into coincidence with the horizontal bar of the cross hair image 66. The position to which the chart 70 is thus shifted is shown in Fig. 6.

The final step in measuring caster of wheel 16 is shown in Fig. 6 and consists in turning this wheel inwardly 20° to cause the beam 65 to impinge on the mirror 57 and to bring the cross hair image 66 again onto the vertical zero line of the chart 70. The caster of the wheel 16 is now measured by the vertical distance between the horizontal zero line of the chart 70 as shown in Fig. 6 and the location of the cross hair image 66 on this chart.

The measurement of caster of wheel 16' is accomplished by exactly the same procedure as above described for the wheel 16 although, of course, by use of the right hand half of the apparatus 10.

Corrections in caster of the wheels 16 and 16' indicated as necessary by the measurement of these values as just described sometimes necessitate the application of tools to the axle and the twisting of an end portion of the axle relative to the balance of the latter.

Should it be advisable to recheck camber and toe following these corrections, this may be accomplished, as already noted, without again jacking up the wheels 16 and 16', by virtue of the fact that compensation for runout as made in the initial steps of my method precludes the necessity of repeating this in order to accurately measure all the alignment characteristics of the dirigible wheels of a given automobile, and even to repeat any such measurements, if desired.

By the method and apparatus of my invention, it is thus seen that considerable time is saved in the use of an optical apparatus for measuring the alignment characteristics of dirigible wheels and the accurate operation of such an apparatus is greatly facilitated.

While the invention has been illustratively disclosed as embodied in a specific method and apparatus, it is to be understood that such embodiment is subject to considerable modification without departing from the spirit of the invention or the scope of the appended claims.

In particular, it should be noted that the invention is applicable to mechanical apparatus of the wheel contacting type as well as to optical apparatus of this classification, specific coverage of this use of the invention, however, being left to a separate application.

Another modification in the manner of practicing the invention which might be mentioned, is the practicability of halting each wheel when compensating for runout with the cross hair image at a different horizontal or vertical extremity of the wobble circle than the lower extremity thereof as in the preferred mode described.

When thus modifying the method, the apparatus would have to be operable so that in the following step of the invention the camber—toe chart could be and would be shifted towards the cross hair image a distance equal to the radius of the wobble circle regardless of which of the vertical and horizontal extremities of the circle the cross hair image had been halted at. When this shifting would require lateral adjustment of the chart film slides 28 and 28', the latter would remain thus adjusted laterally during the subsequent vertical movement of these slides to project caster charts 70 and 70' onto the screens. In view of the fact that is already necessary, however, in the apparatus 10 to provide for vertical sliding movement of the slides 28 and 28', it is preferable to effect compensation for runout for each of the wheels 16 and 16' by a vertical adjustment of the camber chart as herein shown and described.

It should also be noted that while a magnet associated with a steel screen 60 provides a satisfactory marker for use in this invention, other forms of marker might serve this purpose equally well so long as it were shiftable to indicate a precise point spaced from some horizontal reference line on the camber chart a distance equal to the radius of the wobble circle, and which would stay in any manually selected position.

Although the description of the invention refers to the use of lateral wing mirror 55, it is possible in practicing the invention to employ either the wing mirror 56 or the wing mirror 57 of the pivotally mounted assembly 50. To use wing mirror 56, it is necessary to turn the wheel outwardly about 20°, thereby causing the plane of the mirror to move into operating position approximately parallel to the fore and aft axis of the vehicle. The wheel may now be rotated and the method of the invention followed as previously described. A circle of substantially the same diameter will be generated by the cross hair image as would have generated if the lateral mirror had been used and the accuracy of the resulting adjustment will be within commercially allowable limits. If it is desired to utilize the wing mirror 57, the wheel is, of course, turned inwardly approximately 20°.

For convenience, the method of the invention has been described as including the steps of jacking up the car before rotating the wheel, then lowering the car after the wheel has been placed in its adjusted position. While this is the usual procedure, it should be noted that the wheel might rest on powered rollers and so could be rotated and stopped in the adjusted position without performing the jacking up and lowering operation.

I claim:

1. A method of operating an apparatus for measuring alignment characteristics of a pair of dirigible wheels which apparatus comprises, for each one of said wheels, a mirror fixed on said wheel and approximately but not exactly perpendicular to the axis of said wheel, a screen, means providing a chart on said screen, and means mounted independently of said wheel and projecting a beam of light along a path having a fixed orientation relative to a line through the centers of said wheels with the latter turned straight ahead, said beam impinging on said wheel mirror and the reflected beam being directed onto said screen to produce a cross hair image superimposed on said chart, said chart having vertical and horizontal sets of calibrations which sets are laid off respectively to measure two different alignment characteristics of said wheel when said cross hair image is correctly related with said calibrations, said method comprising the steps, for each of said wheels, of rotating said wheel to cause its cross hair image to inscribe a circle on its screen, halting said wheel with said cross hair image at one of the vertical or horizontal extremities of said circle, and shifting said chart in the direction in which said cross hair image is disposed from the center of said circle, a distance equal to the radius of said circle, the location of said cross hair image on said chart being thereby brought into true relation with said vertical and horizontal sets of calibrations permitting true readings to be made on said chart of said two alignment characteristics.

2. A method of operating an apparatus for measuring alignment characteristics of a pair of dirigible wheels which apparatus comprises, for each one of said wheels, a mirror fixed on said wheel and approximately but not exactly perpendicular to the axis of said wheel, a screen, means providing a chart on said screen, and means mounted independently of said wheel and projecting a beam of light along a path having a fixed orientation relative to a line through the centers of said wheels with the latter turned straight ahead, said beam impinging on said wheel mirror and the reflected beam being directed onto said screen to produce a cross hair image superimposed on said chart, said chart having vertical and horizontal sets of calibrations which sets are laid off respectively to measure two different alignment characteristics of said wheel when said cross hair image is correctly related with said calibrations, said method comprising the steps, for each of said wheels, of rotating said wheel to cause its cross hair image to inscribe a circle on its screen, halting said wheel with said cross hair image at one of the vertical or horizontal extremities of said circle, the particular extremity so selected being the same for both wheels, and shifting said chart in the direction in which said cross hair image is disposed from the center of said circle, a distance equal to the radius of said circle, the location of said cross hair image on said chart being thereby brought into true relation with said two sets of calibrations permitting true readings to be made on said chart of said two alignment characteristics.

3. A method of operating an apparatus for measuring camber, toe and steering geometry of a pair of dirigible wheels which apparatus comprises, for each one of said wheels, a mirror fixed on said wheel and approximately but not exactly perpendicular to the axis of said wheel, a screen, means for providing chart means on said screen, and means mounted independently of said wheel and projecting a beam of light along a path having a fixed orientation relative to a line through the centers of said wheels with the latter turned straight ahead, said beam impinging on said wheel mirror and the reflected beam being directed onto said screen to produce a cross hair image, said chart means having horizontal calibrations laid off to measure camber of said wheels and vertical calibrations laid off to measure toe and steering geometry of said wheels when said cross hair images are correctly related with said calibrations, said method comprising the steps, for each of said wheels and the apparatus associated therewith, of rotating said wheel to cause its cross hair image to inscribe a circle on its screen, halting said wheel with said cross hair image at one end of the vertical diameter of said circle, shifting said chart means in the direction in which said cross hair image is disposed from the center of said circle, a distance equal to the radius of said circle, and proceeding to measure camber, toe and steering geometry by the locations of said cross hair images with reference to the horizontal and vertical calibrations of said chart means.

4. A method of operating an apparatus for measuring camber, toe and steering geometry of a pair of dirigible wheels which apparatus comprises, for each one of said wheels, a mirror fixed on said wheel and approximately but not exactly perpendicular to the axis of said wheel, a screen, means for providing chart means on said screen, and means mounted independently of said wheel and projecting a beam of light along a path having a fixed orientation relative to a line through the centers of said wheels with the latter turned straight ahead, said beam impinging on said wheel mirror and the reflected beam being directed onto said screen to produce a cross hair image superimposed on said chart means, said chart means having horizontal calibrations laid off to measure camber of said wheels and vertical calibrations laid off to measure toe and steering geometry of said wheels when said cross hair images are correctly related with said calibrations, said method comprising the steps, for each of said wheels and the apparatus associated therewith, of rotating said wheel to cause its cross hair image to inscribe a circle on its screen, halting said wheel with said cross hair image located at the lower end of the vertical diameter of said circle, shifting said chart means downwardly a distance equal to the radius of said circle, and proceeding to measure camber, toe and steering geometry by the locations of said cross hair images with reference to the horizontal and vertical calibrations of said chart means.

5. An apparatus for producing a measurement, with correction for run-out, of an alignment characteristic of one of a pair of dirigible kingpin mounted wheels of an automobile which comprises: a mirror mounted on said wheel when in use and facing laterally therefrom; an optical system disposed alongside said automobile and mounted independently thereof close to said wheel mirror, said system including a deflecting mirror and a light source for directing a beam of light inwardly against said wheel mirror, the reflected beam impinging upon said deflecting mirror and being deflected thereby alongside said automobile; a screen interposed in the path of said deflected beam to form an indicator image thereon; means providing a chart on said screen with said indicator image falling on said chart when said wheel is turned about its king-pin to a given measuring position, said chart having calibrations which provide a reading of said alignment characteristic by virtue of the location on said chart of said indicator image, said wheel being rotatable about its axis and optionally operable to be halted in any selected position to which said wheel has been thus rotated, said indicator image moving in a circular pattern on said chart when the face of said wheel mirror is non-perpendicular to said axis as said wheel is rotated about said axis; a shiftable marker for marking the location on said screen of a point spaced from any line on said chart selected for a reference line a distance equal to the radius of said circle; and means for shifting said chart to bring said reference line thereof into coincidence with the point so located by said marker whereby the reading aforesaid of said alignment characteristic is corrected to eliminate error otherwise caused therein by said non-perpendicularity of said mirror to said axis.

6. An apparatus for producing a measurement, with correction for run-out, of an alignment characteristic of one of a pair of dirigible kingpin mounted wheels of an automobile which comprises: a mirror mounted on said wheel when in use and facing laterally therefrom; an optical system disposed alongside said automobile and mounted independently thereof close to said wheel mirror, said system including a deflecting mirror and a light source for directing a beam of light inwardly against said wheel mirror, the reflected beam impinging upon said deflecting mirror and being deflected thereby alongside said automobile; a screen of magnetic material interposed in the path of said deflected beam to form an indicator image thereon; means for projecting a chart on said screen with said indicator image falling on said chart, when said wheel is turned about its king-pin to a given measuring position, said chart having calibrations which provide a reading of said alignment characteristic by virtue of the location on said chart of said indicator image, said wheel being rotatable about its axis and optionally operable to be halted in any selected position to which said wheel has been thus rotated, said indicator image moving in a circular pattern on said chart when the face of said wheel mirror is non-perpendicular to said axis as said wheel is rotated about said axis; a shiftable magnet for marking the location on said screen of a point spaced from any line on said chart, selected for a reference line, a distance equal to the radius of said circle; and means for shifting said projected chart to bring said reference line thereof into coincidence with the point so located by said marker whereby the reading aforesaid of said alignment characteristic is corrected to eliminate error otherwise caused therein by said non-perpendicularity of said mirror to said axis.

7. A method of operating an apparatus for measuring alignment characteristics of a pair of dirigible wheels which apparatus comprises, for each one of said wheels, a mirror fixed on said wheel and approximately but not exactly perpendicular to the axis of said wheel, a screen, means providing a chart on said screen, and means mounted independently of said wheel and projecting a beam of light along a path having a fixed orientation relative to a line through the centers of said wheels with the latter turned straight ahead, said beam impinging on said wheel mirror and the reflected beam being directed onto said screen to produce a cross hair image superimposed on said chart, said chart having vertical and horizontal sets of calibrations which sets are laid off respectively to measure two different alignment characteristics of said wheel when said cross hair image is correctly related with said calibrations, said method comprising the steps, for each of said wheels, of rotating said wheel to cause its cross hair image to inscribe a circle on its screen, whereby the diameter of said circle may be measured and the location of the center of said circle with reference to said chart may be noted, halting said wheel with said cross hair image at a particular point on the circumference of said circle and in a particular direction from the center of said circle, and shifting said chart in the direction in which said cross hair image is disposed from the center of said circle, a distance equal to the radius of said circle, the location of said cross hair image on said chart being thereby brought into true relation with said vertical and horizontal sets of calibrations permitting true readings to be made on said chart of said two alignment characteristics.

MYRTON L. VANDERMEER.

References Cited in the file of this patent

UNITED STATES PATENTS

| Number | Name | Date |
|---|---|---|
| 1,412,997 | Bonneau et al. | Apr. 18, 1922 |
| 1,491,962 | Moody | Apr. 29, 1924 |
| 2,249,226 | Peters | July 15, 1941 |
| 2,292,968 | Peters | Aug. 11, 1942 |
| 2,292,969 | Peters | Aug. 11, 1942 |
| 2,346,582 | Insler et al. | Apr. 11, 1944 |
| 2,410,339 | Creagmile | Oct. 29, 1946 |
| 2,470,090 | Carrigan et al. | May 17, 1949 |
| 2,478,609 | Townsley | Aug. 9, 1949 |
| 2,496,324 | Wilson | Feb. 7, 1950 |

FOREIGN PATENTS

| Number | Country | Date |
|---|---|---|
| 571,714 | Germany | Mar. 4, 1933 |
| 484,851 | Great Britain | May 11, 1938 |

OTHER REFERENCES

Journal of the Optical Society of America, July-December 1924, pages 605 to 609 inclusive. Published in Menasha, Wis. (Copy in Division 7.)